(12) United States Patent
Fin

(10) Patent No.: US 10,750,898 B2
(45) Date of Patent: Aug. 25, 2020

(54) BEVERAGE PRODUCING MACHINE

(71) Applicant: SAGA COFFEE S.p.A., Gaggio Montano (IT)

(72) Inventor: Giuseppe Fin, AE Eindhoven (NL)

(73) Assignee: SAGA COFFEE S.P.A., Gaggio Montano (IT)

( * ) Notice: Subject to any disclaimer, the term of this patent is extended or adjusted under 35 U.S.C. 154(b) by 207 days.

(21) Appl. No.: 15/739,431

(22) PCT Filed: Jan. 5, 2016

(86) PCT No.: PCT/EP2016/050061
§ 371 (c)(1),
(2) Date: Dec. 22, 2017

(87) PCT Pub. No.: WO2017/005376
PCT Pub. Date: Jan. 12, 2017

(65) Prior Publication Data
US 2018/0177328 A1 Jun. 28, 2018

(30) Foreign Application Priority Data
Jul. 3, 2015 (EP) .................................. 15175214

(51) Int. Cl.
*A47J 31/34* (2006.01)
*A47J 31/46* (2006.01)
*A47J 31/36* (2006.01)
(52) U.S. Cl.
CPC ....... *A47J 31/3633* (2013.01); *A47J 31/3604* (2013.01); *A47J 31/469* (2018.08)
(58) Field of Classification Search
CPC ................ A47J 31/34–3642; A47J 31/46–461
See application file for complete search history.

(56) References Cited

U.S. PATENT DOCUMENTS

| 5,309,822 A * | 5/1994 | Sager | A47J 31/3614 |
| | | | 99/289 R |
| 2002/0074350 A1* | 6/2002 | Jones | B67D 1/0037 |
| | | | 222/146.5 |

(Continued)

FOREIGN PATENT DOCUMENTS

| FR | 2844441 | 3/2004 |
| FR | 2960406 | 12/2011 |

(Continued)

OTHER PUBLICATIONS

International Search Report for International Application No. PCT/EP2016/050061 dated Mar. 11, 2016.

(Continued)

*Primary Examiner* — Michael A Laflame, Jr.
(74) *Attorney, Agent, or Firm* — Dorsey & Whitney LLP

(57) ABSTRACT

The beverage producing machine comprises a brewing chamber and at least one hydraulic actuator for controlling closing and opening movement of the chamber. A water pump, fluidly connected to the chamber through a first water path and fluidly connected to the actuator through a second water path delivers pressurized water to the chamber and actuator, respectively. A water heater and a first valve arrangement are arranged along the first water path. A second valve arrangement is positioned along the second water path, between the water pump and the actuator. The first and second valve arrangements are configured and controlled such that during a brewing chamber closure step the first valve arrangement is closed, and the second valve arrangement is open. Upon reaching a closure pressure in the actuator, the second valve arrangement is closed and the first valve arrangement is opened, allowing water to be delivered to the chamber.

14 Claims, 6 Drawing Sheets

(56) References Cited

U.S. PATENT DOCUMENTS

| | | | |
|---|---|---|---|
| 2008/0276807 A1* | 11/2008 | Righetti | A47J 31/46 99/289 R |
| 2010/0258009 A1 | 10/2010 | Lin | |
| 2011/0036244 A1* | 2/2011 | Chatterjee | A47J 31/3642 99/283 |
| 2012/0328740 A1* | 12/2012 | Nocera | A47J 31/3623 426/82 |
| 2013/0112084 A1 | 5/2013 | Favero et al. | |
| 2013/0129885 A1* | 5/2013 | Doglioni Majer | A47J 31/002 426/431 |
| 2019/0191919 A1* | 6/2019 | Colonna | A47J 31/46 |

FOREIGN PATENT DOCUMENTS

| | | |
|---|---|---|
| WO | WO2002/058523 | 8/2002 |
| WO | WO2012/049596 | 4/2012 |
| WO | WO2012/093108 | 7/2012 |
| WO | WO2014/108813 | 7/2014 |

OTHER PUBLICATIONS

PCT Demand under Article 31 of the PCT for International Application No. PCT/EP2016/050061 received May 3, 2017.
International Preliminary Report on Patentability for International Application No. PCT/EP2016/050061 dated Jun. 27, 2017.

* cited by examiner

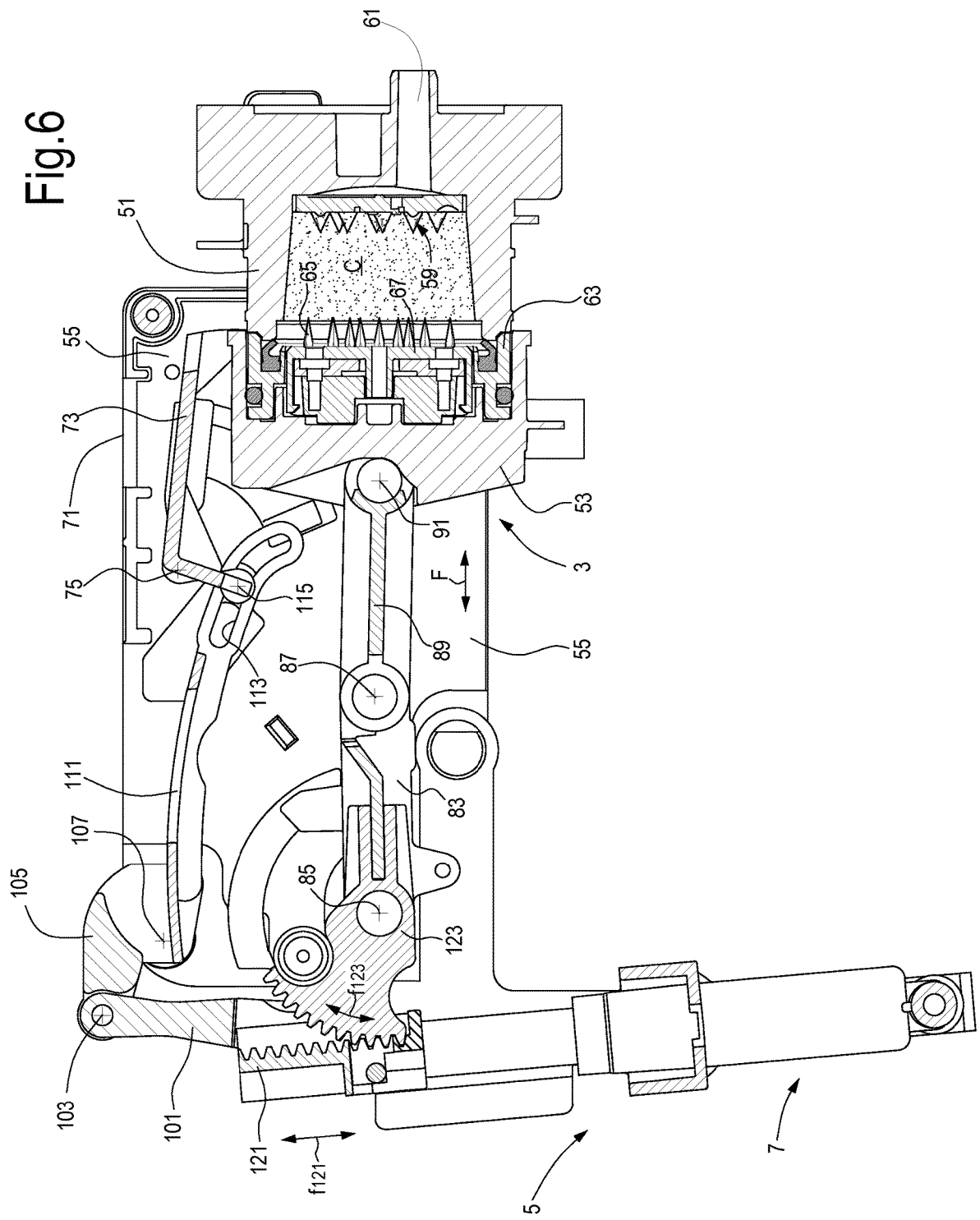

BEVERAGE PRODUCING MACHINE

FIELD OF THE INVENTION

The invention concerns beverage producing machines, and more specifically beverage producing machines comprising a brewing chamber and hydraulic means for controlling the opening and closing or the brewing chamber. Embodiments disclosed herein relate to beverage producing machines using capsules containing at least one ingredient wherefrom the beverage is produced.

BACKGROUND OF THE INVENTION

For producing hot drinks and beverages, such as for example coffee, tea, vegetable based infusions and the like, single dose packaging in the form of so-called capsules or pods are often used. Herein after the term capsule will be used to designate any such single dose packaging, including rigid or soft cartridges, pods or capsules, both gas tight or perforated. It shall be understood that, unless specifically indicated, the term encompasses any kind of single dose packaging suitable for preparing beverages by extraction using hot and possibly pressurized water. A single dose packaging can include sufficient ingredients to prepare more than just one portion beverage, for instance two portions. The term beverage as used herein designates any edible, mainly liquid or semi-liquid product.

Some known beverage producing machines comprise a brewing chamber having at least a first brewing chamber portion and a second brewing chamber portion, which are movable one with respect to the other for receiving a capsule therebetween and sealingly closing the capsule in the brewing chamber. Once the brewing chamber is closed, hot and possibly pressurized water is caused to pass through the brewing chamber and the capsule retained therein. The hot water extracts the ingredients contained in the capsule, producing the hot beverage.

In some beverage producing machines opening and closing of the brewing chamber is performed manually by means of a lever. Other known beverage producing machines are comprised of a hydraulic mechanism for opening and closing the brewing chamber.

For instance US 2013/0112084 discloses a beverage producing machine wherein a pump supplies cold water to a hydraulic piston-cylinder actuator, which opens and closes the brewing chamber. The same pump supplies additional water through a water heater, wherefrom hot water is then dispensed through a pressure regulating valve in the brewing chamber. A capsule can be arranged in the brewing chamber for receiving hot water and dispensing the beverage extracted from the ingredients contained therein by the hot water.

WO2012/049596 discloses a further coffee producing machine, having a hydraulic opening and closing mechanism. The pump provides hot water to the brewing chamber and cold water to a piston-cylinder actuator, which closes and maintains the brewing chamber in the closed position during brewing.

WO-A-02/058523 discloses a brewing unit comprising a brewing chamber having at least a first brewing chamber portion and a second brewing chamber portion, movable one with respect to the other, configured and arranged to take an open position and a closed brewing position. A hydraulic actuator is provided, for controlling the closing and opening movement of the brewing chamber. A water pump is further provided, which is fluidly connected to the brewing chamber through a first water path and further fluidly connected to the hydraulic actuator through a second water path, such that the pump can deliver pressurized water to the brewing chamber and to the hydraulic actuator, respectively. A water heater is arranged along the first water path. A first valve is positioned along the first water path and a second valve is positioned along the second water path, between the water pump and the hydraulic actuator. The first valve comprises a shutter and a spring and is calibrated to open when the water pressure in the first water path achieves a pre-set pressure value. The second valve is an electro-valve which is selectively switched between a first position and a second position. In the first position the second valve fluidly connects the hydraulic actuator to the pump and the first water path. In the second position the second valve fluidly connects the hydraulic actuator with a water return line, through which cold water from the hydraulic actuator is returned to a water tank. When a brewing cycle is performed, the second valve is switched in the first position and the pump starts pumping water in the second water path. The first valve remains closed until the pressure in the first and second water paths achieves the per-set pressure at which the first valve opens. When the first valve opens, water flows through the brewing chamber. The second valve remains open such that the same water pressure is present in both the first and second water paths. The closure pressure of the hydraulic actuator is thus set by the opening pressure of the first valve.

In these known machines having a hydraulic closing mechanism, presurized, hot water is dispensed through the brewing chamber; the pressure must be sufficient to enable the hydraulic actuator to safely maintain the brewing chamber in the closed position, while hot water flows therethrough.

These known devices, therefore, suffer from some limitations concerning the selectable pressure at which the beverage can be extracted, which is determined by the closure pressure. The extraction pressure affects the organoleptic characteristics of the beverage and thus the final result of the brewing process.

A need therefore exists, to further improve these known machines, to overcome or at least alleviate one or more of the limitations of the known machines.

SUMMARY OF THE INVENTION

According to one aspect of the invention, a beverage producing machine is provided, comprising a hydraulic circuit which is designed for controlling the opening and closing of a brewing chamber and for delivering hot pressurized water through the brewing chamber at a pressure which can be independent from the pressure required for closing the brewing chamber. More specifically, according to embodiments disclosed herein, a beverage producing machine is provided, comprising a brewing chamber having at least a first brewing chamber portion and a second brewing chamber portion, movable one with respect to the other, configured and arranged to take an open position and a closed brewing position. Furthermore, at least one hydraulic actuator is provided, for controlling closing and opening movements of the brewing chamber. A water pump is fluidly connected to the brewing chamber through a first water path and further fluidly connected to the hydraulic actuator through a second water path for delivering pressurized water selectively to the brewing chamber and to the hydraulic actuator, respectively. A water heater is arranged along the first water path, for heating brewing water delivered to the brewing chamber. A first valve arrangement is positioned along the first water path.

The beverage producing machine further comprises a second valve arrangement positioned along the second water path, between the water pump and the hydraulic actuator.

The first valve arrangement and the second valve arrangement are configured and controlled such that during a brewing chamber closure step the first valve arrangement is closed and the second valve arrangement is open, and water is delivered by the water pump to the hydraulic actuator. Upon reaching a closure pressure in the hydraulic actuator, the second valve arrangement is closed to fluidly isolate the hydraulic actuator from the water pump and maintain the closure pressure in the hydraulic actuator. The first valve arrangement is opened, thus allowing water to be delivered by the water pump through the water heater in the brewing chamber.

By providing a first valve arrangement and a second valve arrangement the beverage producing machine is thus able to operate at variable brewing pressure values, always under safe closing pressure conditions. The closing pressure is set at a value which can be different, e.g. higher than the brewing pressure. A safe, reliable and flexible beverage producing machine is thus obtained. The brewing pressure can be selectable or adjustable, e.g. with the use of a control signal acting upon the pump, or using a counter-pressure valve, for instance arranged downstream of the brewing chamber. The brewing pressure can thus be set, for instance, at a value which is substantially lower than the pressure required for safely closing the brewing chamber. The beverage producing machine becomes thus more flexible and can offer additional selecting options to the user.

According to some embodiments, to obtain a particularly compact and low-cost configuration, the first valve arrangement can comprise at least a first three-way valve having a valve inlet fluidly coupled to the water heater, a first valve outlet fluidly coupled to the brewing chamber, and a second valve outlet fluidly coupled to a drip tray. The three-way valve can be electronically controlled by a central control unit, to selectively deliver water from the water heater to the brewing chamber and to discharge residual water from the brewing chamber in the drip tray at the end of a brewing cycle.

In some embodiments the first valve arrangement can further comprise a closure valve arranged in series with the first three-way valve, upstream or downstream of the water heater. The additional closure valve can be an electro-valve controlled by the central control unit of the beverage producing machine. The closure valve provides a safer closing action upstream of the first three-way valve, which can thus be simpler and less expensive, since it is not required to withstand the entire upstream pressure generated by the pump during the brewing chamber closing step.

In some embodiments, the second valve arrangement comprises a second three-way valve having a valve inlet fluidly coupled to the water pump, a first valve outlet, fluidly coupled to the hydraulic actuator and a second valve outlet, fluidly coupled to a water tank, wherefrom water is sucked by the water pump. Through the three-way valve, water used to pressurize the actuator can be returned to the water tank, thus reducing the water consumption.

The second valve arrangement can further comprise a non-return valve arranged in series with the second three-way valve and upstream thereof, between the water pump and the second three-way valve. The non-return valve prevents water from flowing back from the hydraulic actuator towards the water pump and/or towards the first water path and maintains the closure pressure in the hydraulic actuator.

In some embodiments the hydraulic actuator comprises at least one cylinder-piston system or two cylinder-piston systems in parallel, which can provide a more balanced closing action.

The brewing unit can comprise a capsule insertion mechanism, with a capsule insertion slot, wherethrough capsules can be introduced by gravity, and a capsule supporting member, configured and arranged such as to retain a capsule in an intermediate position, prior to closing the brewing chamber. A particularly efficient capsule handling arrangement is thus obtained.

The hydraulic actuator can be configured to move at least one of the first brewing chamber portion and second brewing chamber portion to introduce the capsule in the brewing chamber and sealingly close the brewing chamber with the capsule therein. The other brewing chamber can be stationary with respect to a support structure. In other embodiments, both brewing chamber portions can be movable and acted upon by the hydraulic actuator.

The hydraulic actuator can be drivingly coupled to one of the first brewing chamber portion and second brewing chamber portion through an actuating leverage, which provides the correct closing force on the brewing chamber. For instance, the actuating leverage can comprise a pivoting arm, rotatingly supported by a frame housing the brewing chamber, and wherein the pivoting arm is rotatingly hinged to a first connecting rod, in turn pivotally connected to one of said first brewing chamber portion and second brewing chamber portion.

If a capsule supporting member is provided, for supporting the capsule in an intermediate position prior to closing the brewing chamber, the actuating leverage can further comprise a second connecting rod, functionally connected to the capsule supporting member, such that a closure movement imparted by the hydraulic actuator to the brewing chamber also controls a withdrawal movement of the capsule supporting member, to move the capsule supporting member from a capsule supporting position, towards an inoperative position, when the brewing chamber is closed.

According to a further aspect, the invention concerns a method for extracting a beverage from a capsule containing beverage ingredients therein, comprising the following steps:

introducing the capsule in a brewing chamber comprised of at least a first brewing chamber portion and a second brewing chamber portion; sealingly closing the brewing chamber by moving the first brewing chamber portion and the second brewing chamber portion in a sealingly closing position by means of a hydraulic actuator operated by a pressurized fluid delivered by a water pump until a closure pressure is achieved;

interrupting the water flow towards the hydraulic actuator thus maintaining the hydraulic actuator at the closure pressure, while delivering water at a brewing pressure in the brewing chamber by means of said water pump a water heater.

Other features and advantages of the invention will be better appreciated from the following detailed description of exemplary embodiments.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 6 illustrates a sectional view similar to FIG. 4, according to a different embodiment of the brewing unit.

DETAILED DESCRIPTION OF THE EMBODIMENTS

Figure 1:
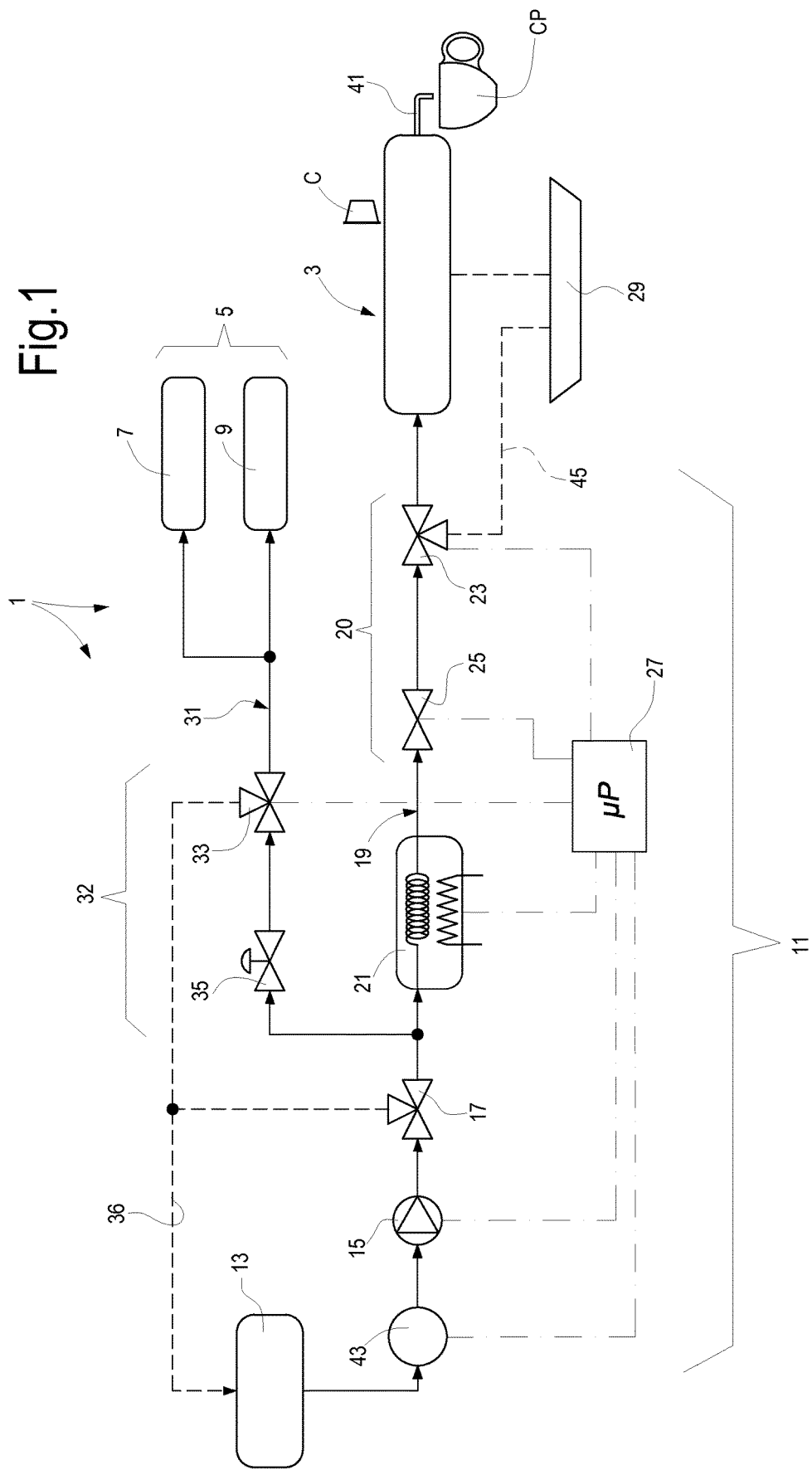
FIG. 1 illustrates a functional diagram of a beverage producing machine according to an embodiment of the present invention.

The invention will be firstly illustrated reference being made to the schematic functional block diagram of FIG. 1. Structural details of embodiments of the invention will be described in greater detail referring to FIGS. 2 to 5.

The beverage producing machine 1 can comprise a brewing unit comprised of a brewing chamber schematically represented by block 3. Details of a brewing chamber according to a possible embodiment will be described in greater detail reference being made to FIGS. 2 to 5. The brewing chamber 3 is functionally coupled to hydraulic actuator 5, which can include a first cylinder piston system 7 and a second cylinder piston system 9. In other embodiments, a single cylinder-piston system can be used. Structural features of embodiments of the hydraulic actuator 5 will be described in greater detail later on reference being made to FIGS. 2 to 5. These figures also illustrate the mechanical connection between the hydraulic actuator 5 and the brewing chamber 3. For the time being, it is sufficient to note that the hydraulic actuator 5 is functionally connected to the brewing chamber 3 such as to open and close the two portions forming the brewing chamber 3, wherein an ingredient-containing capsule C is introduced for the production of a beverage.

In the embodiment illustrated in FIG. 1 the beverage producing machine 1 further comprises a hydraulic circuit 11. The hydraulic circuit 11 can include a water tank 13, wherefrom water is delivered to the hydraulic actuator 5 for driving the opening and closing movement of the brewing chamber 3. Further water is delivered from the water tank through a water heater, to dispense hot water through the brewing chamber 3 during a brewing cycle.

In some embodiments the hydraulic circuit 11 comprises a water pump 15, which pumps water from the water tank 13 towards the hydraulic actuator 5 and the brewing chamber 3. Downstream of the pump 15 a safety valve 17 can be provided. The safety valve 17 is connected to the pump 15 and to the water tank 13 and can be provided as an over-pressure protection valve, which discharges water from the hydraulic circuit in the water tank 13, e.g. if the pressure in the hydraulic circuit exceeds a pressure threshold, e.g. 20-23 bar.

The hydraulic circuit 11 further comprises a first water path 19 which connects the water pump 15 to the brewing chamber 3. Along the first water path 19 a first valve arrangement 20 is positioned. Downstream of the safety valve 17 a water heater 21 is further positioned along the first water path 19. In the embodiment of FIG. 1 the water heater 21 is arranged upstream of the first valve arrangement 20. The inlet of the water heater 21 is fluidly coupled, through the safety valve 17, to the delivery side of the water pump 15. The outlet of the water heater 21 is in turn fluidly coupled to the first valve arrangement 20.

According to some embodiments, the first valve arrangement 20 can comprise a first three-way valve 23 and a closure valve 25 upstream thereof. The three-way valve 23 and the closure valve 25 are arranged in series, with the closure valve 25 located upstream of the three-way 23 with respect to the water flow direction in the first water path 19. The closure valve 25 can be an electrically driven valve, i.e. an electro-valve, electrically controlled for instance through a central control unit 27. Similarly, the first three-way valve 23 can be an electrically driven valve, i.e. an electro-valve, electrically controlled for instance by the central control unit 27.

In other embodiments, the water heater 21 can be positioned between the closure valve 25 and the first three-way valve 23.

The first three-way valve 23 comprises a valve inlet in fluid communication with the closure valve 25 and a first valve outlet in fluid communication with the infusion chamber 3. A second valve outlet of the three-way valve 23 can be fluidly connected to a drip tray 29.

A second water path 31 fluidly connects the water pump 15 to the hydraulic actuator 5. In some embodiments a second valve arrangement 32 is located along the second water path 31. The second valve arrangement 32 can comprise a second three-way valve 33 and a check valve, i.e. a non-return valve 35, positioned upstream of the second three-way valve 33 with respect to the water flow direction along the second water path 31. The three-way valve 33 can be an electrically driven valve, i.e. an electro-valve controlled by the central control unit 27.

The second three-way valve 33 comprises a valve inlet in fluid communication with the water pump 15 through check valve 35 and safety valve 17. A first valve outlet of the second three-way valve 33 is in fluid communication with the hydraulic actuator 5. A second valve outlet of the second three-way valve 33 is in fluid communication with the water tank 13 through a return duct 36.

The operation of the beverage producing machine 1 will now be described reference being made to the schematic functional block diagram of FIG. 1.

When a brewing cycle starts, upon insertion of a capsule C into the brewing chamber 3, the latter will be closed prior to start delivering hot water through the brewing chamber 3, in order to extract the beverage. Closure of the brewing chamber 3 is performed by activating the water pump 15. Water is sucked from the water thank 13 by the water pump 15 and delivered through the second water path 31 to the hydraulic actuator 5. During this step of the brewing cycle, the closure valve 25 is closed, such that no water is delivered through the water heater 29 towards the brewing chamber 3.

The pressurized water delivered to the hydraulic actuator 5 causes the latter to close the brewing chamber as will be described in greater detail, reference being made to the following FIGS. 2 to 5. The second three-way valve 33 is open thus allowing water to flow through the first outlet thereof towards the hydraulic actuator 5. This brewing-chamber closing step ends once the desired closing pressure has been achieved in the hydraulic actuator 5. The pressure can be detected for instance in the cylinder of either one or the other of the two cylinder pistons systems 7, 9, or else along the second water path 31. In other embodiments pressure can be measured in a different position along the hydraulic circuit, or the closure force can be directly measured, for instance by means of a load cell or applied to either one or the other of the two movable brewing chamber portions or on any one of the mechanical members which connect the hydraulic actuator 5 to the brewing chamber 3.

Once the required closing pressure or closing force has been achieved, the valve 25 can be opened and pumping of water towards the brewing chamber 3 can start. If a hot beverage is desired, prior to flowing water through the first water path 19 the water heater 21 must be turned on and delivery of water therethrough will be enabled upon reaching a sufficient temperature inside the water heater, which can be detected by a suitable temperature sensor or the like. The water heater 21 can be a through-flow water heater, having a small inner volume and very high electric power absorption, such that water is instantly heated while the water flow through the water heater 21. The water heater 21 can be turned on e.g. when the beverage producing machine is first started. In some embodiments, the water heater 21 can be maintained in a stand-by condition, which limits the electric power consumption. The water heater 21 can be turned on, or switched from a stand-by condition to an operative condition, e.g. upon starting of a brewing cycle, when the water pump 15 starts pumping cold water to the hydraulic actuator 5. In some embodiments, the water heater 21 can be switched on or turned in an active condition prior to energizing the water pump 15.

Flowing of water from the water pump 15 in and through the brewing chamber 3 is allowed by opening the valve 25 and the three-way valve 23, placing the valve inlet thereof in fluid communication with the first valve outlet. Water pumping will end when the desired amount of water has been delivered through the brewing chamber 3. The beverage is delivered through a beverage dispensing nozzle 41 into a cup CP or other container.

Brewing can be ended manually, when the user has detected the desired amount of beverage in the cup CP.

In other embodiments, the hot water delivery can be stopped automatically, when a certain amount of water has been delivered to the brewing chamber 3. The amount of water can be detected by a flow meter 43, which can be arranged along the flow path between the water tank 13 and the brewing chamber 3, for instance between the water tank 13 and the pump 15.

The delivery pressure of pump 15 can be set at any desired value, for instance even much lower than the closure pressure in the second water path 31. This is made possible by having separate first valve arrangement 20 and second valve arrangement 32. The second valve arrangement 32 maintains the pressure in the downstream section of the second water path 31 at the closure pressure, which has been achieved during brewing chamber closure, said pressure being maintained irrespectively of the actual pressure in the first water path 19.

The brewing pressure can be adjusted in any known manner or can be fixed, depending upon the features of the beverage producing machine 1. For instance, a back-pressure valve (not shown) can be arranged downstream of the brewing chamber 3, between the brewing chamber 3 and the beverage dispensing nozzle 41. The back-pressure valve can be adjustable to set the brewing pressure in the brewing chamber 3 at the desired value. The brewing pressure in the brewing chamber 3 can substantially modify the organoleptic features of the beverage dispensed from the brewing chamber 3. Widely different brewing pressures can be required for different capsules C using different ingredients, for instance for brewing espresso coffee, regular coffee, American coffee, tea, and the like.

Once the required amount of water has been dispensed through the first water path 19, the brewing chamber 3 can be opened and the spent capsule C can be removed. According to some embodiments, prior to opening the brewing chamber 3, the pressure therein can be discharged, for example by switching the three-way valve 23 such that the second valve outlet thereof is opened, while the delivery of water from the water heater 21 is stopped. The residual pressure inside the brewing chamber 3 can be discharged for instance along a venting line 45 which can end on top of the drip tray 29.

Once the pressure in the brewing chamber 3 has been released, the hydraulic actuator 5 can be opened, by switching the three-way valve 33, such water contained in the hydraulic actuator 5 is returned through return duct 36 in the water tank 13. Water from the hydraulic actuator 5 is thus recovered, such that the total consumption of water is reduced.

FIGS. 2 through 5 illustrate mechanical and structural details of an exemplary embodiment of the brewing chamber 3 and relevant hydraulic actuator 5.

The brewing chamber 3 can be comprised of a first brewing chamber portion 51 and a second brewing chamber portion 53. Either one or the other or both the brewing chamber portions 51 and 53 can be movable with respect to a frame 55. The frame 55 can be stationary housed in a casing of the beverage producing machine 1, not shown.

In the exemplary embodiment illustrated in FIGS. 2 to 5 the first brewing chamber portion 51 is stationary with respect to the frame 55, while the second brewing chamber portion 53 is movable according to double arrow F under the control of the hydraulic actuator 5.

In the embodiment shown in FIGS. 2 to 5, the first brewing chamber portion 51 has an inner recess 57, which can be shaped according to the shape of the capsule C. The shape of the brewing chamber portion 51 and more specifically of the recess 57 thereof can change depending upon the shape of the capsule used. The recess 57 can house a perforating plate 59 arranged in the bottom of the recess 57. The perforating plate 59 has the function of perforating the capsule during closure of the brewing chamber 3, in a manner known per se and not disclosed.

Reference number 61 designate a beverage dispensing duct fluidly coupled to the beverage dispensing nozzle 41.

The second brewing chamber portion 53 can comprise a closing member 63 which is configured to close the opening of the recess 57 of the first brewing chamber portion 51.

In some embodiments, the second brewing chamber portion 53 can in turn be provided with a second perforator 65, which extends through a plate 67 during closure of the brewing chamber 3, such that the second perforator 55 perforates a top closing wall of the capsule C.

It shall be understood that the above described structure of the brewing chamber 3 is given just as an exemplary embodiment of a possible brewing chamber configuration. The details of the brewing chamber 3 and relevant brewing chamber portions 51 and 53 can vary depending upon the design of the brewing chamber 3 which in turn can depend upon the features of the capsule C for which the brewing chamber 3 is designed. These details will therefore not be further described herein.

On top of the frame 55 a capsule insertion slot 71 can be provided, wherethrough capsules C can be introduced by gravity according to arrow G.

In some embodiments, to the brewing chamber 3 a supporting member 73 can be combined. The supporting member 73 is configured and arranged for supporting the capsule C in an intermediate position, upon insertion through the capsule insertion slot 71, prior to closing the brewing chamber 3. The supporting member 73 can be variously designed according to the structure of the brewing chamber. The actual structure of the supporting member is independent of the features of the hydraulic circuit of the beverage producing machine and can vary, e.g. depending upon to the features and structure of the brewing chamber 3.

By way of example only, in the illustrated exemplary embodiment the supporting member 72 is hinged at 75 to the frame 55, in which the brewing chamber 3 is housed. The supporting member 73 is designed such that a capsule C introduced in the brewing chamber 3 through the capsule insertion slot 71 will be retained in an intermediate position between the first brewing chamber portion 51 and the second brewing chamber portion 53, while the latter is in the open position. In some embodiments the capsule can be retained in the intermediate position by resting on the supporting member 73 and can on the brewing chamber portion 51.

When the brewing chamber 3 is closed by moving the second brewing chamber portion 53 towards and against the first brewing chamber portion 51, the capsule is pushed by the supporting member 73 into the recess 57, while the supporting member 73 moves upwards. Closure of the brewing chamber 3 is completed by clearing the supporting member 73 off the trajectory of the second brewing chamber portion 53 moving towards the first brewing chamber portion 51.

Figure 2:
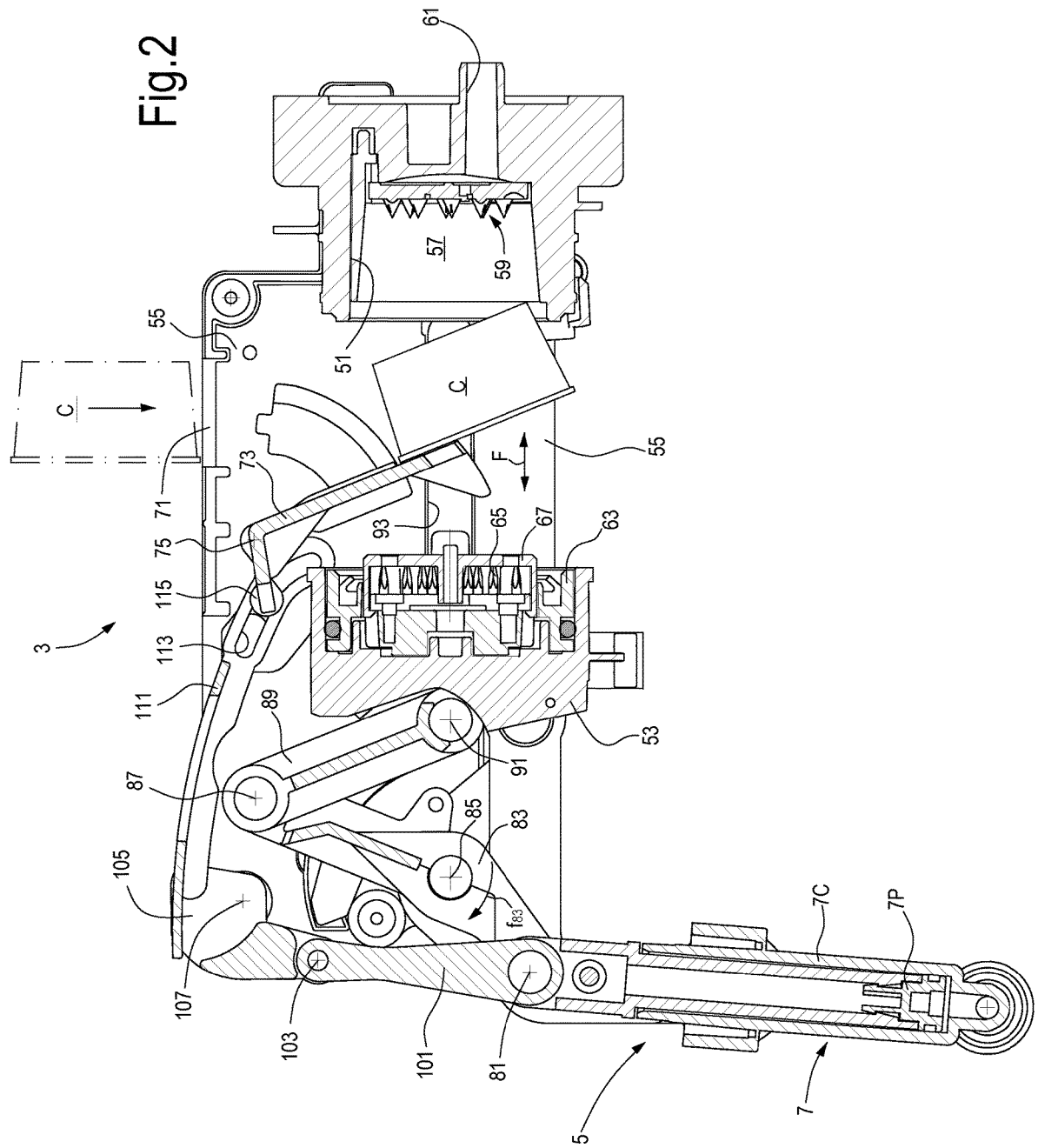
FIG. 2 illustrates a sectional view of the brewing chamber and relevant hydraulic actuator in an open position.
Figure 4:
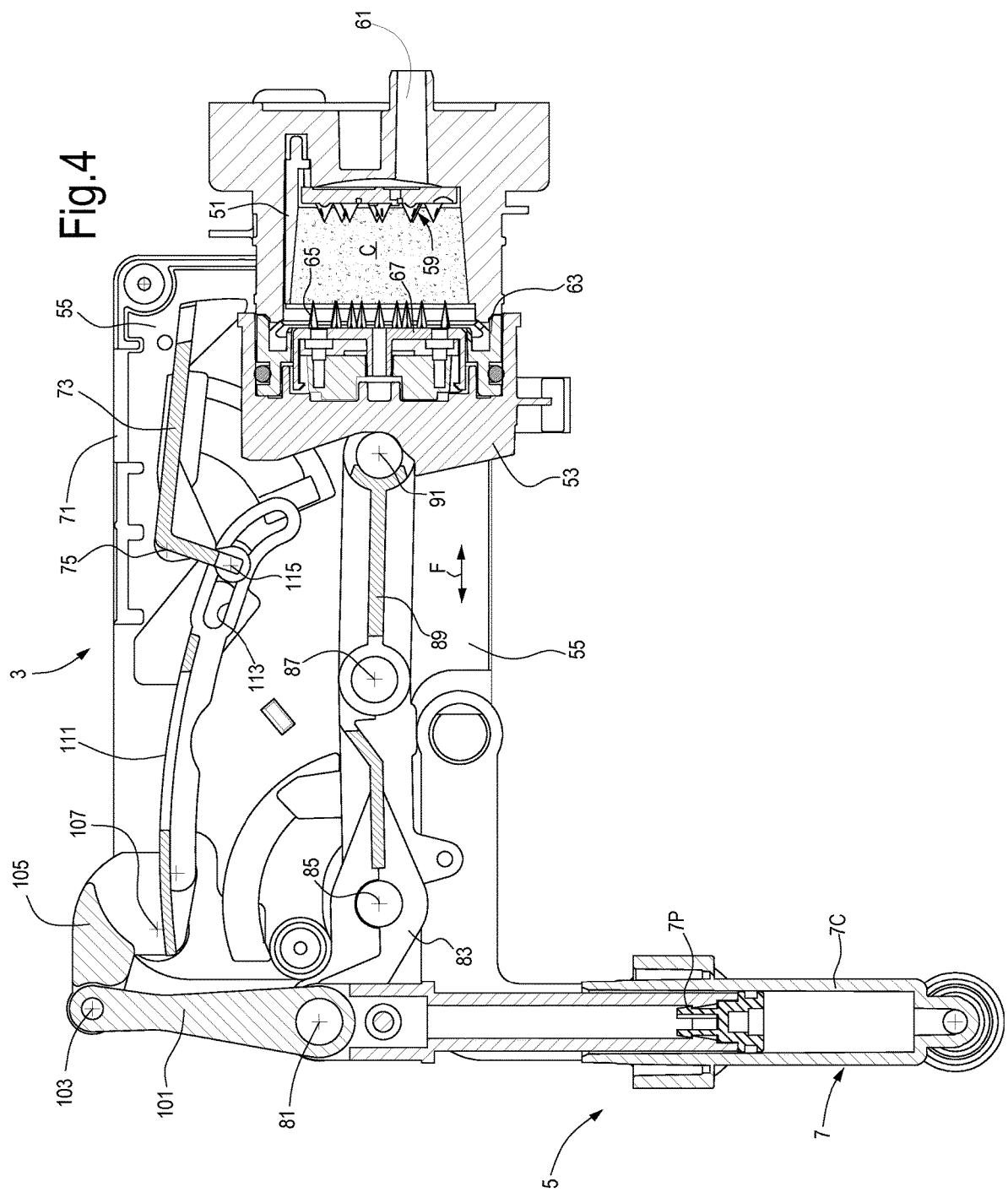
FIG. 4 illustrates a sectional view similar to FIG. 2 with the brewing chamber in the closed position.

In FIG. 2 the supporting member 73 is in the active position, where can support a C in the intermediate position. In FIG. 4 the supporting member 73 has been cleared off the trajectory of the movable brewing chamber portion 53 and the two brewing chamber portions 51 and 53 are in the sealingly closed position with the capsule C therebetween, ready for receiving the pressurized hot water therethrough.

In FIGS. 2 to 5 a possible structure of the hydraulic actuator 5 is disclosed in more detail. Also disclosed are the mechanical members, wherewith the hydraulic actuator 5 controls the movement of the brewing chamber portion 53 and of the supporting member 73 to move it clear off the trajectory of the movable brewing chamber portion 53.

Figure 3:
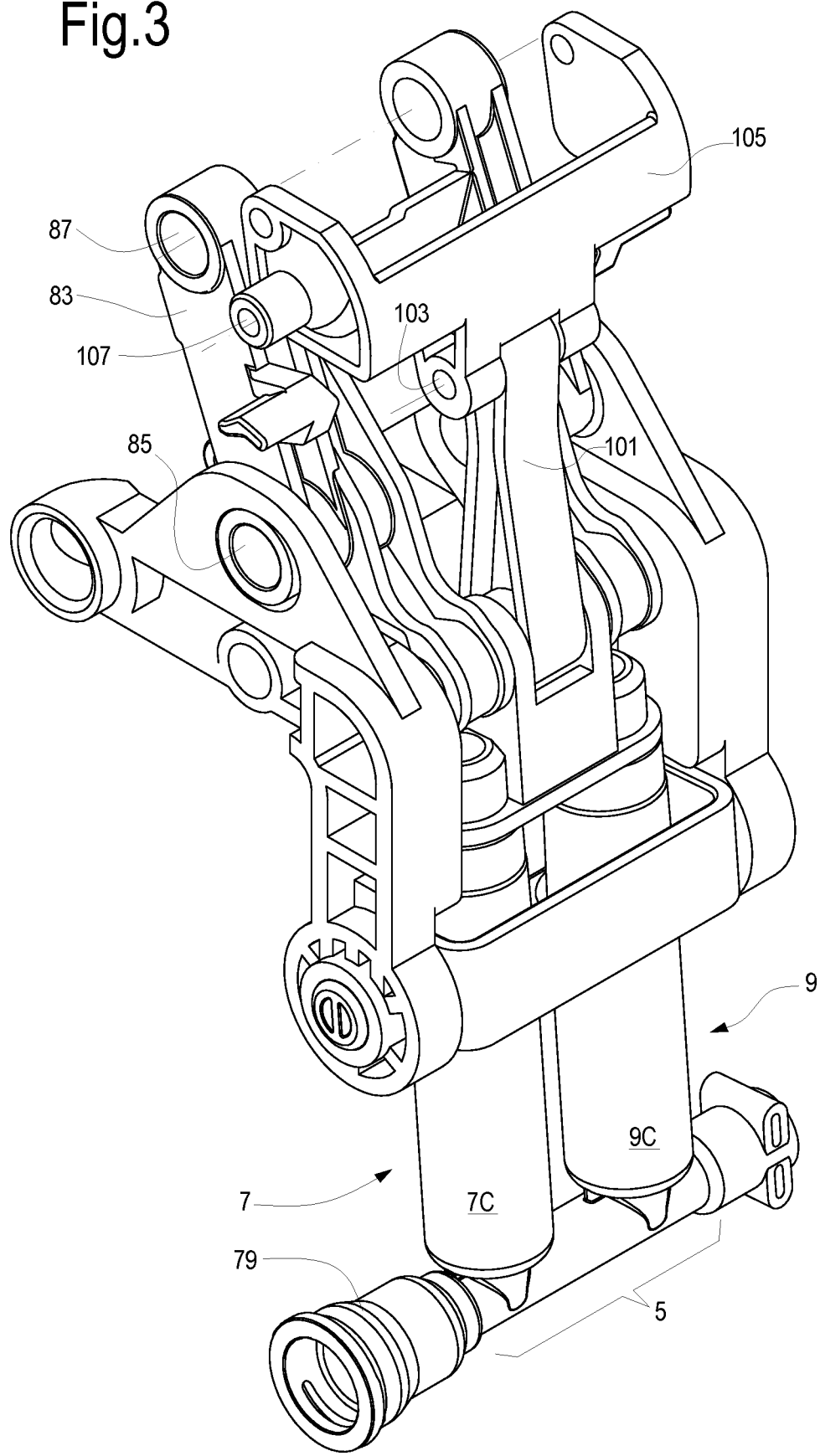
FIG. 3 illustrates an axonometric view of the hydraulic actuator in the position of FIG. 2.
Figure 5:
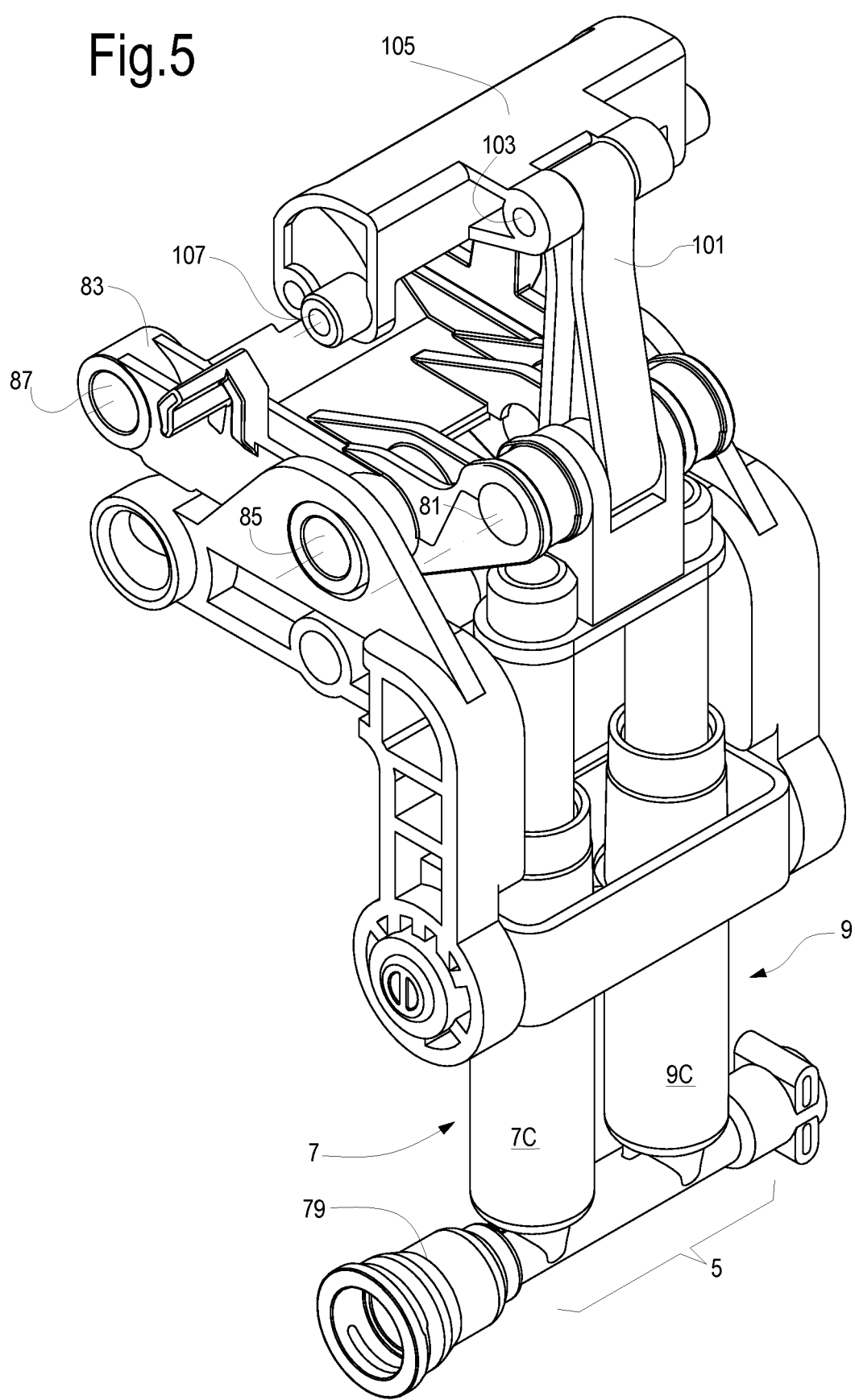
FIG. 5 illustrates an axonometric view of the hydraulic actuator in the position of FIG. 4.

The two cylinder-piston systems 7 and 9 forming the hydraulic actuator 5 are best shown in FIGS. 3 and 5. They are both connected to the same water inlet 79 which represents the end portion of the second water path 31. Reference numbers 7C and 9C designate the cylinders of the two cylinder-piston systems 7 and 9 while reference numbers 7P and 9P designated the pistons slidingly housed in the cylinders 7C and 9C.

The rods of each piston 7P, 9P extending outwardly from the respective cylinder 7C and 9C is hinged at 81 to a pivoting arm 83. The arm 83 is in turn pivotally hinged at 85 to the frame 55 and can rotate therearound. An end of the pivoting arm 83 opposite the hinge 81 is hinged at 87 to a first connecting rod 89. The connecting rod 89 is hinged in turn at 91 to the movable brewing chamber portion 53, which can be guided along a preferably rectilinear guide channels 93. The guide channels can be formed on each of the opposed flanks of the frame 55 and can be preferably oriented horizontally.

As can be easily appreciated by comparing FIGS. 2 and 4, when the pistons 7P, 9P of the two cylinder-piston systems 7, 9 are in the extended position, the pivoting arm 83 rotates according to arrow f83, in a clockwise direction in the drawings, thus causing the forward movement along the guide channels 93 of the movable brewing chamber portion 53 towards the closing position against the fixed brewing chamber portion 51. Conversely, when the pistons 7P, 9P are retracted in the respective cylinders 7C, 9C of the two cylinder-piston systems 7, 9 the pivoting arm 83 is returned in the original position (FIG. 2) where the movable brewing chamber portion 53 is in the open position, spaced apart from the fixed brewing chamber portion 51.

As can best be seen in FIGS. 3 and 5, in the illustrated embodiment the pivoting arm 83 is in actual fact a double arm, connected whereto is a double connecting rod 89. The two portions of the double connecting rod 89 are arranged on the two opposite sides of the movable brewing chamber portion 53, such that a better control and a more efficient distribution of closing force is obtained.

In the embodiment illustrated in FIGS. 2 through 5, a second connecting rod 101 is hinged around the pin 81 to the rods of pistons 7P and 9P. The distal end of the second connecting rod 101 is hinged at 103 to a pivoting member 105 which is connected to the frame 55 such as to pivot around an axis 107.

The pivoting member 105 is in turn pivotally connected to a lever 111, the distal end whereof comprises a cam profile 113 in the form of an arcuate channel. The cam profile 113 engages a follower 115, which is integral with the supporting member 73 and is slidingly movable in the cam profile 113.

As best shown in FIGS. 3 and 5, the lever 111 can be a dual lever, forming a dual cam profile 113, arranged inside and adjacent two opposite side walls of the frame 55, wherebetween the brewing chamber 3 is arranged. A dual follower 115, extending from both sides of the supporting member 73, engages in the dual cam profile 113.

As can be appreciated from FIGS. 2 and 4, the extraction and refraction movement of the pistons 7P, 9P of the two cylinder-piston systems 7, 9 forming the hydraulic actuator 5 cause a pivoting movement of the pivoting member 105 and correspondingly, through the lever 111, a pivoting movement of the supporting member 73 around axis 75. This movement causes the supporting member 73 to take up the cleared off position of FIG. 4, allowing full closure and re-opening of the brewing chamber 3 by moving the movable brewing chamber portion 53 towards and away from the stationary brewing chamber portion 51.

FIG. 6 illustrates a sectional view of a brewing unit 2 comprised of a brewing chamber 3 in a second exemplary embodiment. The same parts, elements and components already disclosed in connection with FIGS. 2 to 5 are labeled with the same reference numbers and will not be described again. The main difference between the embodiment of FIG. 6 and the embodiment of FIGS. 2-5 relates to the mechanical connection between the hydraulic actuator 5 and the pivoting arm 83. In the embodiment of FIG. 6, the cylinder-piston systems 7, 9 can be rigidly mounted on the frame 55. The pistons of the cylinder-pistons 7, 9 are rigidly connected to a toothed rack 121, which meshes with a gear sector 123. The gear sector 123 is rigidly connected or integrally formed with the pivoting arm 83. The rectilinear reciprocating movement according to arrow f121 of the toothed rack 121, controlled by the cylinder-piston systems 7, 9, is thus converted into a pivoting reciprocating movement of the gear sector 123 and of the pivoting arm 83, which in turn controls the reciprocating opening and closing motion of the brewing chamber portion 53.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification and in the appended claims, specify the presence of the stated features, integers, steps, operations, elements and/or components, but do not preclude the presence or addition of one or more other features, integers, steps, operations, elements, components and/or groups thereof.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

The invention claimed is:

1. A beverage producing machine, comprising:
    a brewing chamber having at least a first brewing chamber portion and a second brewing chamber portion movable with respect to the other, the brewing chamber configured and arranged to take an open position and a closed brewing position;
    at least one hydraulic actuator for controlling closing and opening movement of the brewing chamber;
    a water pump fluidly connected to the brewing chamber through a first water path and further fluidly connected to the at least one hydraulic actuator through a second water path for delivering pressurized water to the brewing chamber and to the at least one hydraulic actuator, respectively;
    a water heater arranged along the first water path;
    a first valve arrangement positioned along the first water path; and
    a second valve arrangement positioned along the second water path, between the water pump and the at least one hydraulic actuator;
    wherein the first valve arrangement and the second valve arrangement are configured and controlled such that, during a brewing chamber closure step, the first valve arrangement is closed and the second valve arrangement is open to cause water to be delivered by the water pump to the at least one hydraulic actuator;
    wherein the first valve arrangement and the second valve arrangement are further configured and controlled such that, upon reaching a closure pressure in the at least one hydraulic actuator, the second valve arrangement is closed to fluidly isolate the at least one hydraulic actuator from the water pump and maintain the closure pressure in the at least one hydraulic actuator, and the first valve arrangement is opened to cause water to be delivered by the water pump to the brewing chamber through the water heater.

2. The beverage producing machine of claim 1, wherein the first valve arrangement includes at least a first three-way valve having a valve inlet fluidly coupled to the water heater, a first valve outlet fluidly coupled to the brewing chamber, and a second valve outlet fluidly coupled to a drip tray.

3. The beverage producing machine of claim 2, wherein the first valve arrangement includes a closure valve arranged in series with the first three-way valve, upstream or downstream of the water heater.

4. The beverage producing machine of claim 1, wherein the second valve arrangement includes a second three-way valve having a valve inlet fluidly coupled to the water pump, a first valve outlet fluidly coupled to the at least one hydraulic actuator, and a second valve outlet fluidly coupled to a water tank; and wherein the water tank is fluidly coupled to the water pump.

5. The beverage producing machine of claim 4, wherein the second valve arrangement includes a non-return valve arranged in series with the second three-way valve, between the water pump and the second three-way valve.

6. The beverage producing machine of claim 1, wherein the at least one hydraulic actuator includes at least one cylinder-piston system.

7. The beverage producing machine of claim 1, wherein the at least one hydraulic actuator includes two cylinder-piston actuators arranged in parallel.

8. The beverage producing machine of claim 1, wherein one of the first brewing chamber portion and second brewing chamber portion has a cup-shaped recess for receiving a capsule containing ingredients for the production of the beverage.

9. The beverage producing machine of claim 1, further comprising:
    a capsule insertion mechanism, with a capsule insertion slot, wherethrough capsules can be introduced by gravity; and
    a capsule supporting member, configured and arranged such as to retain a capsule introduced through the capsule insertion slot;
    wherein the at least one hydraulic actuator moves at least one of the first brewing chamber portion or the second brewing chamber portion, to introduce the capsule in the brewing chamber and sealingly close the brewing chamber with the capsule therein.

10. The beverage producing machine of claim 1, wherein the at least one hydraulic actuator is drivingly coupled to one of the first brewing chamber portion or the second brewing chamber portion through an actuating leverage.

11. The beverage producing machine of claim 10, wherein the actuating leverage includes a pivoting arm, rotatingly supported by a frame housing the brewing chamber, and wherein the pivoting arm is rotatingly hinged to a first connecting rod, in turn pivotally connected to one of the first brewing chamber portion or the second brewing chamber portion.

12. The beverage producing machine of claim 11, wherein the at least one hydraulic actuator is drivingly coupled to the actuating leverage by a rack and gear arrangement, the rack being integral with the at least one hydraulic actuator and the gear being integral with the pivoting arm of the actuating leverage and rotates integrally therewith.

13. The beverage producing machine of claim 10, wherein the actuating leverage includes a second connecting rod, functionally connected to a capsule supporting member, such that a closure movement imparted by the at least one hydraulic actuator to the brewing chamber controls a withdrawal movement of the capsule supporting member, to remove the capsule supporting member from a capsule supporting position, between the first brewing chamber portion and the second brewing chamber portion, when the brewing chamber is in the open position, towards an inoperative position, when the brewing chamber is closed.

14. The beverage producing machine of claim 1, wherein at least one of the first brewing chamber portion and/or the second brewing chamber portion is movable in an approximately horizontal direction.

* * * * *